US011193021B2

(12) United States Patent
Sperindio et al.

(10) Patent No.: US 11,193,021 B2
(45) Date of Patent: *Dec. 7, 2021

(54) SOL-GEL COMPOSITIONS WITH IMPROVED HARDNESS AND IMPACT RESISTANCE

(71) Applicant: PPG Industries Ohio, Inc., Cleveland, OH (US)

(72) Inventors: Matteo Sperindio, Brescia (IT); Scott C. Lake, West Chester, PA (US); Riccardo Piras, Cagliari (IT); Michael J. Lindstrom, Downington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,756

(22) Filed: Dec. 6, 2019

(65) Prior Publication Data

US 2020/0216669 A1    Jul. 9, 2020

Related U.S. Application Data

(63) Continuation of application No. 15/312,950, filed as application No. PCT/US2015/030072 on May 11, 2015, now Pat. No. 10,544,306.

(60) Provisional application No. 62/000,679, filed on May 20, 2014.

(51) Int. Cl.
*C08L 83/04* (2006.01)
*C09D 183/04* (2006.01)
*C09D 201/10* (2006.01)

(52) U.S. Cl.
CPC ............ *C08L 83/04* (2013.01); *C09D 183/04* (2013.01); *C09D 201/10* (2013.01)

(58) Field of Classification Search
CPC ...... C09D 201/10; C09D 183/04; C08L 83/04
USPC .................................................. 106/287.14
See application file for complete search history.

(56) References Cited

U.S. PATENT DOCUMENTS

| 4,180,613 | A | * | 12/1979 | Vassiliou | ............ | C09D 183/04 |
| | | | | | | 427/387 |
| 4,181,686 | A | | 1/1980 | Vassillou | | |
| 5,571,569 | A | | 11/1996 | Kato et al. | | |
| 6,395,341 | B1 | | 5/2002 | Motoomi et al. | | |
| 6,638,600 | B2 | | 10/2003 | Gazo et al. | | |
| 7,108,947 | B2 | | 9/2006 | Wu et al. | | |
| 7,517,928 | B2 | | 4/2009 | Blender et al. | | |
| 7,914,809 | B2 | | 3/2011 | Atanasoska et al. | | |
| 8,071,219 | B2 | * | 12/2011 | Berrux | ...................... | B05D 7/14 |
| | | | | | | 428/446 |
| 10,119,094 | B2 | * | 11/2018 | Barth | .................... | C09D 161/06 |
| 10,543,520 | B2 | * | 1/2020 | Berrux | ................ | B05D 3/0209 |
| 10,544,306 | B2 | * | 1/2020 | Sperindio | ............... | C08L 83/04 |
| 10,752,783 | B2 | * | 8/2020 | Gantillon | ............... | B05D 5/086 |
| 10,806,295 | B2 | * | 10/2020 | Santini | ..................... | A47J 31/60 |
| 2004/0058157 | A1 | | 3/2004 | Ishikawa | | |
| 2005/0214556 | A1 | | 9/2005 | Nishimi et al. | | |
| 2006/0167147 | A1 | | 7/2006 | Asgari | | |
| 2006/0251837 | A1 | | 11/2006 | Cnossen | | |
| 2008/0017070 | A1 | | 1/2008 | Prezzi et al. | | |
| 2008/0032122 | A1 | * | 2/2008 | Berrux | ..................... | A47J 36/04 |
| | | | | | | 428/335 |
| 2009/0108488 | A1 | | 4/2009 | Matsumoto | | |
| 2009/0163670 | A1 | | 6/2009 | Aoshimi et al. | | |
| 2009/0272731 | A1 | | 11/2009 | Olding et al. | | |
| 2011/0118361 | A1 | | 5/2011 | Matoishi et al. | | |
| 2011/0236680 | A1 | * | 9/2011 | Jahrling | ............. | C23C 18/1283 |
| | | | | | | 428/339 |
| 2011/0308989 | A1 | * | 12/2011 | Berrux | ..................... | A47J 36/02 |
| | | | | | | 206/524.3 |
| 2012/0247641 | A1 | | 10/2012 | Ruggiero et al. | | |
| 2013/0065993 | A1 | | 3/2013 | Backer et al. | | |
| 2013/0245149 | A1 | | 9/2013 | Geiser et al. | | |
| 2013/0319522 | A1 | | 12/2013 | Koike et al. | | |
| 2013/0337233 | A1 | | 12/2013 | Chen et al. | | |
| 2014/0147598 | A1 | * | 5/2014 | Windrich | ................ | B05D 5/08 |
| | | | | | | 427/514 |
| 2014/0170425 | A1 | | 6/2014 | Lin | | |
| 2015/0104576 | A1 | * | 4/2015 | Kim | ..................... | A47J 36/025 |
| | | | | | | 427/267 |
| 2017/0158863 | A1 | * | 6/2017 | Caillier | ................ | C09D 133/12 |

FOREIGN PATENT DOCUMENTS

| CN | 100546710 | 10/2009 |
| JP | 54-047727 A | 4/1979 |
| JP | 03-764 | 1/1991 |
| JP | 2011-139813 | 5/2001 |
| JP | 2001-258746 A | 9/2001 |
| JP | 2005-045140 | 2/2005 |
| JP | 2006-137821 | 6/2006 |

(Continued)

OTHER PUBLICATIONS

International Search Report dated Jul. 28, 2015 in PCT/US2015/030072.
Written Opinion dated Jul. 28, 2015 in PCT/US2015/030072.
International Preliminary Examination on Patentability dated Jul. 29, 2016 in PCT/US2015/030072.
Houel, Amélie et al., "Synthesis and characterization of hybrid files from hyperbranched polyester using a sol-gel process", Journal of Applied Polymer Science, vol. 131, Issue 3, Feb. 5, 2014.
Kim, Youngkyoo et al., "Precursor of Polymer Effect on Polyimide/Silica Hybrid Nanocomposite Films", Journal of Nanoscience and Nanotechnology, vol. 9, No. 3, 2009.
Chattopadhyay, D.K., et al., "Organic-inorganic hybrid coatings prepared from glycidyl carbamate resins and amino-functional silanes", vol. 63, Issue 4, Nov. 2008.

(Continued)

*Primary Examiner* — Margaret G Moore
(74) *Attorney, Agent, or Firm* — Adam F. Cox

(57) ABSTRACT

The present disclosure provides a hybrid coating composition including a siloxane-based polymer and an organic polymer. The composition can be applied to a wide variety of substrates include metals, ceramic materials, plastics, composites, minerals and the like. A process for making articles is also provided.

15 Claims, 13 Drawing Sheets

(56) References Cited

FOREIGN PATENT DOCUMENTS

| | | |
|---|---|---|
| JP | 2006-176688 | 7/2006 |
| WO | 2006/077256 | 7/2006 |
| WO | 2011/117410 | 9/2011 |

OTHER PUBLICATIONS

Xenopoulos, C. et al., "Optimization of Morphology of Polyimide-Silica Hybrids in the Production of Matrices for Carbon Fibre Composites", High Performance Polymers, vol. 13, No. 3, Sep. 2001.

Wen, Jianye et al., "Organic/Inorganic Hybrid Network Materials by the Sol-Gel Approach", Chemistry of Materials, 1996.

Wen, J. et al., "Hybrid Organic/Inorganic Coatings for Abrasion Resistance on Plastic and Metal Substrates", MRS Proceedings, vol. 435, 1996.

Novak, B.M., Hybrid Nanocomposite Materials—between inorganic glasses and organic polymers, Advanced Materials, vol. 5, Issue 6, Jun. 1993.

Extended Search Report dated Jan. 3, 2018 in corresponding European Application No. 15796459.4.

Written Opinion dated Sep. 14, 2017 in corresponding Singapore Application No. 11201609628U.

Chinese Office Action dated Mar. 5, 2019 in corresponding Chinese Application No. 201580026163.X and English language translation of the same.

PTFE Coating Process, "pffe applied coatings"; fluoroprecision.co.uk.com (Year: 2018).

Application Polytetrafluorethylene (PTFE), Sympatec.com (Year: 2018).

Microdispers-3000 product data sheet, polysciences.com (Year: 2018).

Solvay Specialty Polymers Ryton V-1 data sheet; MatWeb.com (Year: 2018).

Polyphenylene Sulfide (PPS) Plastic; onmesuc.specialchem.com (Year: 2018).

* cited by examiner

SOL-GEL COMPOSITIONS WITH IMPROVED HARDNESS AND IMPACT RESISTANCE

CROSS-REFERENCE TO RELATED APPLICATIONS

The present application is continuation of U.S. patent application Ser. No. 15/312,950, now U.S. Pat. No. 10,544,306, which is a National Stage of International Application No. PCT/US2015/030072, filed May 11, 2015, which claims priority to U.S. Provisional Application No. 62/000,679, filed May 20, 2014, and the entire disclosures of each are hereby expressly incorporated herein by reference.

BACKGROUND

1. Field of the Invention

The present invention relates to sol-gel compositions, and in particular, relates to hybrid sol-gel compositions having improved properties. In one embodiment, a coating may be formed of the composition to provide a surface having improved properties such as increased hardness, abrasion resistance, impact resistance, and chemical resistance.

2. Description of the Related Art

Sol-gel reactions to form siloxane matrices are known. The sol-gel reaction occurs in two distinct steps, as shown below.

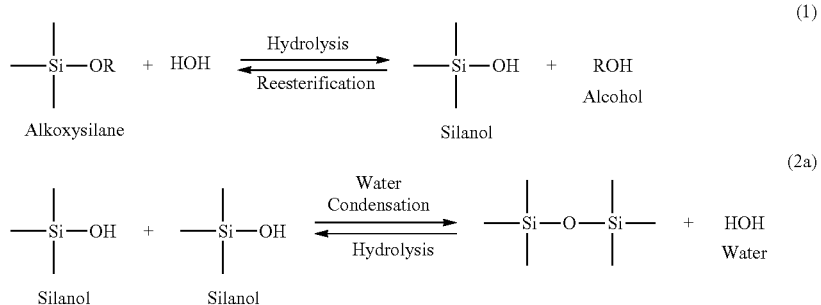

In the first step (1), an alkoxysilane is hydrolyzed by water to form the corresponding silanol. This step can be acid or base catalyzed, although acid catalyzed systems are typical for commercial systems.

In the second step (2a), a condensation reaction between two silanol molecules forms a siloxane (Si—O—Si) bond. Depending on the molecular structure of the alkoxysilane, after hydrolysis, the condensation step can then repeat in two or more directions forming a matrix. The gelation or matrix formation is the film-forming step.

The entire reaction sequence can take place at room temperature or at elevated temperatures. Curing or condensation of the formed silanols is much slower than the hydrolysis. Curing can occur very slowly at room temperature, but commercially curing is typically accomplished in a box or tunnel oven.

Typical siloxane coatings based on sol-gel reactions form highly crosslinked matrices which tend to be very brittle and easily chipped. The excessive brittleness leads to very low scratch and abrasion resistance.

Typical hybrid compositions including a siloxane matrix and organic polymers generally are admixtures of an already-formed inorganic matrix and an organic polymer, or contain organic polymers having alkoxysilane groups that can undergo sol-gel condensation reactions. These compositions involve complex synthesis and tend not to be commercially viable. Additionally, the typical hybrid compositions have a low use temperature due to the organic polymers used, thereby limiting their applications.

Improvements in the foregoing are desired.

SUMMARY

The present disclosure provides a hybrid coating composition comprising a siloxane-based polymer and an organic polymer. It has been discovered that if organic polymers are added to the sol-gel precursor mixtures, significant improvements in hardness and abrasion properties can be obtained and preserved up to temperatures close to the melting point, glass-transition temperature, or heat deflection temperature of the chosen polymer. The composition can be applied to a wide variety of substrates including metals, ceramic materials, plastics, composites, minerals and the like. A process for making articles is also provided.

In one exemplary embodiment, a hybrid sol-gel coating composition is provided. The hybrid sol-gel coating composition includes a siloxane matrix; and an organic polymer. The organic polymer comprises at least one of the following: an amorphous thermoplastic having a glass transition temperature of 200° C. or greater; a crystalline thermoplastic having a melt point of 200° C. or greater; and a thermosetting polymer having a heat deflection/distortion temperature of 200° C. or greater. In a more particular embodiment, the organic polymer comprises an amorphous thermoplastic having a glass transition temperature of 200° C. or greater.

In a more particular embodiment of any of the above embodiments, the hybrid sol-gel coating includes an inorganic filler. In another more particular embodiment, the inorganic filler is silicon carbide.

In a more particular embodiment of any of the above embodiments, the organic polymer is present as separate phase inclusions in the siloxane matrix. In another more particular embodiment of any of the above embodiments, the siloxane matrix defines a plurality of spaces in the matrix, the organic polymer being positioned in the plurality of spaces.

In a more particular embodiment of any of the above embodiments, the organic polymer is selected from the group consisting of: polyphenylene sulfide (PPS); polyethersulones (PES), polyether ether ketone (PEEK); polyphenylsulfone (PPSU); polyethersulfone (PESU); polyamide-imides (PAT); polyetherimides (PEI), and combinations of the foregoing. In an even more particular embodiment, the organic polymer comprises polyphenylene sulfide (PPS). In a more particular embodiment of any of the above embodiments, the organic polymer comprises 2 wt. % to 50 wt. % of the composition on a total dry weight basis.

In a more particular embodiment of any of the above embodiments, the siloxane matrix is formed from an organoalkoxysilane of the formula:

$$R_xSi(OR')_{4-x}$$

wherein: R is one or more moieties chosen independently from linear, branched, or cyclic alkyl and aryl; R' is methyl, ethyl, propyl or alkyl; and x is at least 0 and less than 4. In an even more particular embodiment R is $C_6$ aryl or $C_1$-$C_6$ linear or branched alkyl. In another more particular embodiment, x is at least 1 and less than 4. In an even more particular embodiment, x is 1. In another more particular embodiment of any of the above embodiments, the siloxane matrix is formed from an organoalkoxysilane selected from the group consisting of: methyltrimethoxy-silane, methyltriethoxysilane, dimethyldiethoxysilane, dimethyldimethoxysilane, trimethyl-methoxysilane, trimethylethoxysilane, phenyltrimethoxysilane, phenyl triethoxysilane, and combinations of the foregoing.

In one exemplary embodiment, a composition for forming a hybrid sol-gel coating is provided. The composition includes at least one organoalkoxysilane, at least one organic polymer, and at least one solvent. The organic polymer comprises at least one of the following: a crystalline thermoplastic having a melt point of 200° C. or greater; an amorphous thermoplastic having a glass transition temperature of 200° C. or greater; and a thermosetting polymer having a heat deflection/distortion temperature of 200° C. or greater. In a more particular embodiment of any of the above embodiments, the composition further includes an inorganic filler, such as silicon carbide. In a more particular embodiment of any of the above embodiments, the organic polymer comprises 2 wt. % to 50 wt. % of the composition on a total dry weight basis. In another more particular embodiment of any of the above embodiments, the organic polymer comprises polyphenylene sulfide (PPS).

In one exemplary embodiment, a coated article is provided. In one exemplary embodiment, the articles is coated with a hybrid sol-gel coating according to any of the above embodiments. In one exemplary embodiment, the article is an article of cookware.

In one exemplary embodiment, a method of forming a coating is provided. the method includes providing a mixture, applying the mixture to a substrate, and curing the mixture to produce a hybrid sol-gel coating. In one more particular embodiment, the mixture is a composition according to any of the above embodiments, In another embodiment, the mixture comprises an organosiloxane and an organic polymer, wherein the organic polymer comprises at least one of the following: a crystalline thermoplastic having a melt point of 200° C. or greater; an amorphous thermoplastic having a glass transition temperature of 200° C. or greater; and a thermosetting polymer having a heat deflection/distortion temperature of 200° C. or greater. In a more particular embodiment of any of the above embodiments, the method further includes hydrolysing the organosiloxane with the catalyst before applying the mixture to the substrate.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

The disclosure is explained in greater detail below in reference to the figures. In the figures.

DETAILED DESCRIPTION

Figure 1A:
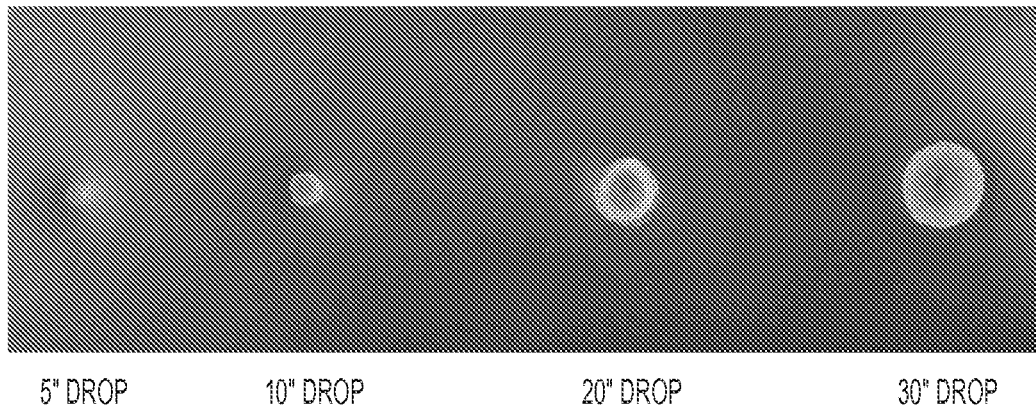
FIG. 1A is related to Example 1 and shows the results of impact testing on a conventional sol-gel coated panel.

The present invention provides hybrid sol-gel compositions that, in one exemplary application, may be applied as a coating.

I. Hybrid Sol-Gel Compositions.

Hybrid sol-gel compositions as described herein contain at least one siloxane matrix formed from an organoalkoxysilane and at least one organic polymer. The composition may optionally include one or more catalysts, one or more fillers, and one or more solvents.

While not wishing to be bound by theory, it is believed that the organic polymer is present, or is captured within, spaces in the matrix formed by the siloxane polymer. In this context, the organic polymer functions as an organic filler phase that is interspersed within, and throughout, the void spaces present in the inorganic, siloxane polymer matrix. As seen, for example, in FIGS. 3 and 4, the organic polymer is present as an organic phase separate from the sol gel matrix or inorganic phase formed by the siloxane polymer. The organic polymer is present in discrete portions interspersed in the sol gel matrix. The organic polymer phase is also believed to not be chemically bound to the sol gel matrix. The organic polymer particles or the organic phase absorb the impact energy via compressibility and act as stress-release centers, which can stop crack propagation.

a. Organoalkoxysilanes

In some exemplary embodiments, the organoalkoxysilane is of the formula:

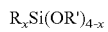

wherein:
R is one or more moieties chosen independently from linear, branched, or cyclic alkyl and aryl;
R' is methyl, ethyl, propyl or alkyl; and
x is at least 0 and less than 4.

In some exemplary embodiments, R is $C_6$ aryl or a linear or branched alkyl having from as few as 1, 2, 3, or as many as 4, 5, 6, or more carbon atoms, or a number of carbon atoms within any range defined between any two of the foregoing values. In a more particular embodiment, R is selected from methyl, ethyl, propyl, and phenyl.

In some embodiments, x is at least 1 and less than 4. In further embodiments, x is 1.

In some exemplary embodiments, the organoalkoxysilane is selected from the group consisting of: methyltrimethoxysilane, methyltriethoxysilane, dimethyldiethoxysilane, dimethyldimethoxysilane, trimethylmethoxysilane, trimethylethoxysilane, phenyltrimethoxysilane, phenyl triethoxysilane, and combinations of the foregoing.

In some embodiments, the organoalkoxysilane is a functionalized siloxane, such as 3-aminopropyltriethoxysilane, (3-glycidoxypropyl)trimethoxysilane, and allyltrimethoxysilane.

In some exemplary embodiments, the organoalkoxysilane comprises as little as 1 wt. %, 5 wt. %, 10 wt. %, 13 wt. % 15 wt. %, 20 wt. %, 25 wt. %, 30 wt. %, as great as 31 wt. % 35 wt. %, 40 wt. %, 45 wt. %, 50 wt. %, 60 wt. %, 70 wt. %, 75 wt. % or more of the total composition weight on a wet basis, or within any range defined between any two of the foregoing values. In some particular embodiments, the organoalkoxysilane comprises from 1 wt. % to 75 wt. %, from 5 wt. % to 50 wt. %, or from 10 wt. % to 35 wt. % of the total composition weight on a wet basis.

In some exemplary embodiments, the organoalkoxysilane comprises as little 1 wt. %, 5 wt. %, 10 wt. %, 15 wt. %, 20 wt. %, 25 wt. %, 30 wt. %, 35 wt. %, 40 wt. %, 45 wt. %, 50 wt. %, as great as 55 wt. %, 60 wt. %, 65 wt. %, 70 wt. %, 75 wt. %, 80 wt. %, 85 wt. %, 90 wt. %, 95 wt. %, 99 wt. %, of the total composition weight on a dry (solids) basis, or within any range defined between any two of the foregoing values. In some particular embodiments, the organoalkoxysilane comprises from 1 wt. % to 99 wt. %, from 5 wt. % to 50 wt. %, or from 25 wt. % to 45 wt. % of the total composition weight on a dry (solids) basis.

b. Organic Polymers

The organic polymer may be selected from the group consisting of: polyphenylene sulfide (PPS), polyethersulfone (PES), polyether ether ketone (PEEK), polyphenylsulfone (PPSU), polyethersulfone (PESU), polyamide-imides (PAI), polyetherimides (PEI), and combinations of the foregoing. In a more particular embodiment, the organic polymer is polyphenylene sulfide (PPS). In another more particular embodiment, the organic polymer is polyethersulfone (PES).

The organic polymer may be a crystalline thermoplastic having a melt point of 200° C. or greater, as determined by differential scanning calorimetry (DSC), for example. Alternatively, the organic polymer may be an amorphous thermoplastic having a glass transition temperature (Tg) of 200° C. or greater, as determined by differential scanning calorimetry (DSC), for example. Still further, the organic polymer may be a thermosetting polymer having a heat deflection/distortion temperature (HDT) of 200° C. or greater, as determined by ASTM D648.

In some exemplary embodiments, the organic polymer comprises as little as 1 wt. %, 1.5 wt. %, 1.75 wt. %, 5 wt. %, 7 wt. %, 10 wt. %, 15 wt. %, 20 wt. %, 21 wt. %, 25 wt. %, 30 wt. %, as great as 35 wt. %, 40 wt. %, 45 wt. %, 50 wt. %, 60 wt. %, 70 wt. %, 75 wt. % of the total composition weight on a wet basis, or within any range defined between any two of the foregoing values. In a more particular embodiment the organic polymer comprises from 1 wt. % to 75 wt. %, from 1 wt. % to 20 wt. %, or from 2% to 20% of the total composition weight on a wet basis.

In some exemplary embodiments, the organic polymer comprises as little as 1 wt. %, 1.5 wt. %, 1.75 wt. % 2 wt. %, 5 wt. %, 7 wt. %, 10 wt. %, 15 wt. %, 20 wt. %, 21 wt. %, 25 wt. %, 30 wt. %, 35 wt. %, 40 wt. %, 45 wt. %, as great as 50 wt. %, 55 wt. %, 60 wt. %, 65 wt. %, 70 wt. %, 75 wt. %, 80 wt. %, 85 wt. %, 90 wt. %, 95 wt. %, 99 wt. % of the total composition weight on a dry (solids) basis, or within any range defined between any two of the foregoing values, such as 1 wt. % to 99 wt. %, 2 wt. % to 50 wt. %, 15 wt. % to 35 wt. %, or 20 wt. % to 30 wt. % on a dry (solids) basis.

In some exemplary embodiments, the organic polymer comprises as little as 1 wt. %, 2 wt. %, 5 wt. %, 10 wt. %, 15 wt. %, 20 wt. %, 25 wt. %, 30 wt. %, 35 wt. %, 40 wt. %, 45 wt. %, as great as 50 wt. %, 55 wt. %, 60 wt. %, 65 wt. %, 70 wt. %, 75 wt. %, 80 wt. %, 85 wt. %, 90 wt. %, 100 wt. % of the total composition weight of the organoalkoxysilane and colloidal silica, or within any range defined between any two of the foregoing values. In a more particular embodiment the organic polymer comprises from 1 wt. % to 100 wt. %, from 2 wt. % to 80 wt. %, or from 2 wt. % to 15 wt. % of the total composition weight on a wet basis. In some exemplary embodiments, total weight of the organoalkoxysilane and colloidal silica is greater than the total weight of the organic polymer. In a more particular embodiment, the total weight of the organoalkoxysilane is greater than the total weight of the organic polymer.

In some exemplary embodiments, the organic polymer is provided as a particle. In one embodiment, the organic polymer is provided as a plurality of particles having a median diameter, or D50, as little as about 0.5 microns, 1 micron, 2 microns, 5 microns, as great as 10 microns, 20 microns, 50 microns, or within any range defined between any two of the foregoing values, such as 0.5 microns to 50 microns, 1 micron to 20 microns, or 5 microns to 10 microns. In one embodiment, the organic polymer is provided as a plurality of particles in which 99% of the particles have a particle diameter, or D99, as great as about 100 microns, 75 microns, 60 microns, as little as 50 microns, 40 microns, 30 microns, or less, or within any range defined between any two of the foregoing values.

d. Catalysts

The catalyst may be selected from an acid catalyst or a base catalyst. Typically acid catalysts are used due to a longer shelf life of the resulting catalyst-containing mixture.

In some embodiments, acid catalysts provide a longer pot life for the mixture. Exemplary acid catalysts include inorganic and organic acids such as hydrochloric acid, phosphorous acid, phosphoric acid, phytic acid, nitric acid, acetic acid, oxalic acid, malic acid, maleic acid, citric acid, formic acid, and benzoic acid.

Exemplary base catalysts include organic and inorganic bases such as such as sodium hydroxide, ammonium hydroxide, ethanolamine, or dimethylaminoethanol.

In some exemplary embodiments, the catalyst comprises as little as 0.05 wt. %, 0.1 wt. %, 0.2 wt. %, 0.3 wt. %, 0.5 wt. %, as great as 1 wt. %, 2 wt. %, 3 wt. %, 5 wt. %, of the total composition weight on a wet basis, or within any range defined between any two of the foregoing values, such as 0.05 wt. % to 5 wt. %, 0.1 wt. % to 3 wt. %, or 0.3 wt. % to 3 wt. %.

e. Fillers

The composition may additionally comprise one or more fillers. Exemplary fillers include silicas such as colloidal silica, aluminas, titanias, zirconias, talc, wollastonite, quartz, mica, barium sulphate, silicon carbide, potassium titanate plates or whiskers, short glass fibers, inorganic and organic pigments, and release agents, such as silicone release agents.

In some exemplary embodiments, the fillers comprise as little as 1 wt. %, 2 wt. %, 5 wt. %, 10 wt. %, 15 wt. %, as great as 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. % of the total composition weight on a wet basis, or within any range defined between any two of the foregoing values.

In some exemplary embodiments, the fillers comprise as little as 1 wt. %, 2 wt. %, 5 wt. %, 10 wt. %, 15 wt. %, 20 wt. %, 25 wt. %, 30 wt. %, 35 wt. %, as great as 40 wt. %, 45 wt. %, 50 wt. %, 55 wt. %, 60 wt. %, 65 wt. %, 70 wt. %, 75 wt. %, or 80 wt. % of the total composition weight on a dry (solids) basis, or within any range defined between any two of the foregoing values.

In some exemplary embodiments, the filler comprises colloidal silica. While not wishing to be bound by theory, it is believed that the sol-gel reaction starts on the surface of the colloidal silica and radiates outward. Exemplary colloidal silica has a particle size as small as 10 nm, 20 nm, 50 nm, as great as 100 nm, 200 nm, 500 nm, or within any range defined between any two of the foregoing values.

In some exemplary embodiments, the colloidal silica comprises as little 1 wt. %, 2 wt. %, 5 wt. %, 10 wt. %, 15 wt. %, as great as 20 wt. %, 25 wt. %, 30 wt. %, 35 wt. %, 40 wt. %, 45 wt. %, 50 wt. %, of the total composition weight on a wet basis, or within any range defined between any two of the foregoing values.

In some exemplary embodiments, the colloidal silica comprises as little 1 wt. %, 2 wt. %, 5 wt. %, 10 wt. %, 15 wt. %, 20 wt. %, 25 wt. %, as great as 30 wt. %, 35 wt. %, 40 wt. %, 45 wt. %, 50 wt. %, 55 wt. %, 60 wt. %, 65 wt. %, 70 wt. %, 75 wt. % of the total composition weight on a dry basis, or within any range defined between any two of the foregoing values.

In some exemplary embodiments, the filler comprises an inorganic filler, such as silicon carbide. In one embodiment, the inorganic filler is a hard organic filler, such as a ceramic particle with a Knoop hardness of 1200 or higher. While not wishing to be bound by theory, it is believed that the silicon carbide is better embedded in the coating in the presence of the organic polymer. In some exemplary embodiments, the silicon carbide comprises as little as 0.1 wt. %, 0.2. wt. %, 0.5 wt. %, 1 wt. %, as great as 2 wt. %, 5 wt. %, 10 wt. %, of the total composition weight on a wet basis, or within any range defined between any two of the foregoing values. In some exemplary embodiments, the silicon carbide comprises as little as 0.1 wt. %, 0.2. wt. %, 0.5 wt. %, 1 wt. %, as great as 2 wt. %, 5 wt. %, 10 wt. %, 15 wt. %, 20 wt. % of the total composition weight on a dry basis, or within any range defined between any two of the foregoing values.

f. Solvents

The composition may include one or more solvents. Exemplary solvents include water, alcohols such as $C_1$-$C_8$ alcohols including methanol, ethanol, isopropanol, and t-butanol, $C_2$-$C_8$ ketones including acetone, $C_2$-$C_{20}$ ethers including dipropylene glycol methyl ether and other protic or non-protic solvents like dimethylsulfoxide or N-methylpyrollidone.

II. Methods of Forming Hybrid Coatings a. Mixing of Components

The coating composition is formed by mixing the components. In one embodiment, the components may be mixed together prior to applying the resulting coating composition to a substrate, and one of ordinary skill in the art may determine the point at which mixing is performed prior to application depending on the extent of hydrolysis and condensation of the silane reactants that is desired prior to application of the coating composition to the substrate. In other embodiments, subsets of the components may be prepared with each subset including components that are not reactive with other components within each subset, with two or more subsets of the components being combined prior to applying the resulting composition to the substrate.

In some exemplary embodiments, the organic polymer is ground using a ball mill processor to produce a plurality of granule particles, which are then mixed with one or more of the remaining components as described above. The granule particles may have the particle sizes as described above, such as a D50 of 0.5 microns to 50 microns, 1 micron to 20 microns, or 5 microns to 10 microns.

b. Substrates

In some exemplary embodiments, the coating composition is applied to the surface of a substrate. Exemplary substrates include metals, ceramic materials, plastics, composites, and minerals. Exemplary metals include stainless steel, aluminum, and carbon steel. Exemplary ceramic materials include glasses like borosilicate glass, porcelain enamels, various fired clays and other refractory materials. Exemplary plastics and composites include high melting point plastics and composites, such as plastics having a melting point higher than the cure temperature of the coating formulation, including polyester, polypropylene, ABS, polyethylene, carbon fiber epoxy composites, and glass fiber epoxy composites. Exemplary minerals include micas, basalts, aluminas, silicas, and wollastonites, marble and granite.

In some exemplary embodiments, the substrate is a portion of a pan or other article of cookware.

c. Flashing

In some exemplary embodiments, after the coating composition is applied to the substrate, the resulting coating is flash heated to remove water and co-solvents before curing. In some embodiments, the coating is flash heated at a temperature of as low as 80° F. (27° C.), 100° F. (38° C.), 120° F. (49° C.), 150° F. (66° C.), as high as 180° F. (82° C.), 200° F. (93° C.), 220° F. (104° C.), or higher, or within any range defined between any two of the foregoing values. In some embodiments, the coating is flash heated for as little as 30 seconds, 1 minute, 2 minutes, 5 minutes, as long as 8 minutes, 10 minutes, 15 minutes, or longer, or within any range defined between any two of the foregoing values. In a more particular embodiment, the coating is flash heated for about 1 to 10 minutes at a temperature from about 100° F. (38° C.) and to about 200° F. (93° C.).

d. Curing

Curing or condensation of the formed silanols is much slower than the hydrolysis so the activated mixtures typically have a useable pot life as long as 24 hours. Curing can occur very slowly at room temperature, but curing is typically accomplished in at elevated temperatures, such as in a box or tunnel oven.

In some embodiments, the coating is cured at a temperature of as low as 400° F. (204° C.), 430° F. (221° C.), 535° F. (279° C.), 620° F. (279° C.), as high as 660° F. (349° C.), 700° F. (371° C.), 790° F. (421° C.), 800° F. (427° C.), 820° F. (438° C.) or higher, or within any range defined between any two of the foregoing values. In some embodiments, the coating is cured for as little as 5 minutes, 10 minutes, 15 minutes, 20 minutes, 25 minutes, as long as 30 minutes, 45 minutes, 60 minutes, or longer, or within any range defined between any two of the foregoing values. In a more particular embodiment, the coating is cured for about 10-30 minutes at a temperature from about 430° F. (221° C.) and to about 800° F. (427° C.). In another more particular embodiment, the coating is cured for about 5-20 minutes at a temperature from about 535° F. (279° C.) and to about 790° F. (421° C.).

III. Coating Properties

In one exemplary embodiment, the organic polymer is present, or is captured within, spaces in the matrix formed by the siloxane polymer. In this context, the organic polymer functions as an organic filler phase that is interspersed within, and throughout, the void spaces present in the inorganic, siloxane polymer matrix. As seen, for example, in FIGS. 3 and 4, the organic polymer is present separate from the sol gel matrix formed by the siloxane polymer. The organic polymer is present in discrete portions interspersed in the sol gel matrix.

In some exemplary embodiment, the sol gel matrix formed by the siloxane polymer maintains the structure of the overall coating at temperatures above the melting point, glass transition temperature, heat deflection/distortion temperature, and/or softening point of the organic polymer. In this way, the matrix holds the coating such that the coating does not fail up to typical use temperatures of about 250° C. to 300° C.

In some exemplary embodiments, the coating includes the siloxane matrix, the organic polymer and an inorganic filler, illustratively a hard inorganic filler such as silicon carbide. While not wishing to be bound by theory, it is believed that the silicon carbide is better embedded in the coating in the presence of the organic polymer. The inclusion of a hard inorganic filler such as silicon carbide is believed to increase the abrasion resistance, and an unexpected synergistic effect is found with the addition of the organic polymer. It is believed that the organic polymer absorbs impact energy via the compressibility of the polymer, further increasing the abrasion resistance of the coating.

a. Hardness

Exemplary methods of determining coating or film hardness include ASTM D3363 and ISO 15184. As used herein, hardness is determined using an Erichsen Hardness Test Pencil Model 318S. The test pencil is held upright on the test surface and a 5 mm to 10 mm long line is drawn on the surface at a rate of approximately 10 mm/sec. The hardness value is determined by the applied pressure (in N) indicated on test pencil.

In some embodiments, the coating has increased hardness compared to a similar sol-gel composition lacking organic polymers.

In some embodiments, the coating hardness is as low as 10, 12, 14, as high as 16, 18, 20, or higher, or within any range defined between any two of the foregoing values.

b. Abrasion Resistance

Exemplary methods of determining abrasion resistance include British Standard 7069-1988, EN 12983-1:2004, and taber abrasion tests. As used herein, abrasion resistance is determined using a Dry Reciprocating Abrasion Test (DRAT). This test measures the resistance of coatings to abrasion by a reciprocating Scotch-Brite pad. Scotch-Brite pads are made by 3M Company, Abrasive Systems Division, St Paul, Minn. 55144-1000. Pads come in grades with varying levels of abrasiveness as follows: Lowest—7445, 7448, 6448, 7447, 6444, 7446, 7440, 5440—Highest. A Scotch-Brite 7447 pad was used and changed every 1000 cycles.

The test subjects a coating to abrasion in a back and forth motion. The test is a measure of the useful life of coatings that have been subjected to scouring and other similar forms of damage caused by cleaning. TM 135C is specific to a test apparatus built by Whitford Corporation of West Chester, Pa. However, it is applicable to similar test methods such as the one described in British Standard 7069-1988 and EN 12983-1:2004.

A test machine capable of holding a 2 inch Scotch-Brite abrasive pad of a specific size to the surface to be tested with a fixed 3 kg force and capable of moving the pad in a back and forth (reciprocating) motion over a distance to 10-15 cm (4 to 6 inches). The force and motion are applied by a free falling, weighted stylus. The machine is equipped with a counter. The coated substrate is secured under the reciprocating pad by firmly fastening with bolts, clamps or tape. The part should be as flat as possible and long enough so that the pad does not run off an edge.

The abrasive pad is then cycled back and forth (one back-and-forth trip is defined as 1-cycle), and the machine was allowed to run for 1000 cycles. After 1000 cycles, the pad was replaced with a fresh pad. The test was run until 10% of the abraded area was exposed to bare metal. The abrasion resistance is reported as number of cycles per thousandth inch of coating (cycles/mil).

In some embodiments, the coating has increased abrasion resistance compared to a similar sol-gel composition lacking engineered plastics.

In some embodiments, the coating has a DRAT abrasion resistance as low as 50,000 cycles/mil, 70,000 cycles/mil, 80,000 cycles/mil, as high as 85,000 cycles/mil, 90,000 cycles/mil, 100,000 cycles/mil, or higher, or within any range defined between any two of the foregoing values.

c. Impact Resistance

An exemplary method of determining impact resistance is ASTM D2794. As used herein impact resistance is determined using an SPI Modified Impact Tester from Gardner Company using a 4 pound weight. The weight is dropped from increasing heights (such as 5 inches, 10 inches, 20 inches, 30 inches) on to the coating surface. The impacted panels are soaked for 1 hour in a 1.0 wt. % antimony trichloride slurry followed by rinsing. The surface is then examined to determine if the coating has been removed by the impact.

In some embodiments, the coating has increased impact resistance compared to a similar sol-gel composition lacking engineered plastics.

In some embodiments, the coating is not removed by a 4 pound weight dropped from as little as 5 inches, 10 inches, 20 inches, 30 inches, or higher, or within any range defined between any two of the foregoing values.

d. Chemical Resistance

As used herein, chemical resistance is determined using 24 hours of exposure to hydrochloric acid, such as a 10 wt. % or 30 wt. % hydrochloric acid solution, or to sodium hydroxide, such as a 10 wt. % sodium hydroxide solution.

In some embodiments, the coating has increased acid and/or alkali chemical resistance compared to a similar sol-gel composition lacking engineered plastics.

e. Resistance to Thermal Degradation

As used herein, thermal degradation refers to a temperature at which thermal gravimetric weight loss substantially increases. In some embodiments, the coating is thermally resistant at a temperature of about 200° C., 300° C., 350° C., 400° C., 450° C., 500° C., 550° C., 600° C., or higher.

EXAMPLES

The following non-limiting Examples illustrate various features and characteristics of the present invention, which is not to be construed as limited thereto. Throughout the Examples and elsewhere herein, percentages are by weight unless otherwise indicated.

Example 1

Comparison of a Conventional Sol-Gel System with a Hybrid System

A conventional black sol-gel system was compared with a hybrid system containing polyphenylene sulfide (PPS).

Methyltrimethoxy silane (MTMS) was added in the indicated amount to a stirred mixture containing the remaining components summarized in below in Table 1.

TABLE 1

Component Summary

| Component | Conventional Coating Composition (wt. %) | Hybrid Coating Composition (wt. %) |
|---|---|---|
| MTMS | 31.2 | 33 |
| Silicone fluid | 1.16 | 1.2 |
| PPS | 0 | 6.7 |
| Colloidal Silica (30%) | 43.2 | 45.2 |
| Black Pigments | 2.17 | 2.92 |
| Acid Catalyst | 0.66 | 0.7 |
| Pigment Dispersant | 0.5 | 1.15 |
| Defoamer | 0.58 | 0.52 |
| Silicon Carbide | 1 | 0.98 |
| Dipropylene Glycol Methyl Ether (DPM) Solvent | 6.6 | 6.4 |
| Other Fillers | 12.93 | 1.23 |
| TOTAL | 100 | 100 |

The mixture was stirred for 3 hours, then applied by spraying to pre-heated (130° F./54° C.) grit-blasted aluminum panels. The panels were then flashed at 200° F. (93° C.) for 10 minutes, and then cured for 30 minutes at 620° F. (327° C.).

Testing of Coatings

Hardness: Hardness testing was conducted using an Erichsen Hardness Test Pencil Model 318S. Results are shown on Table 2 below:

TABLE 2

| Erichsen Hardness (Newtons) | |
|---|---|
| Conventional Coating | Hybrid Coating |
| 8 | 18-20 |

Figure 1B:
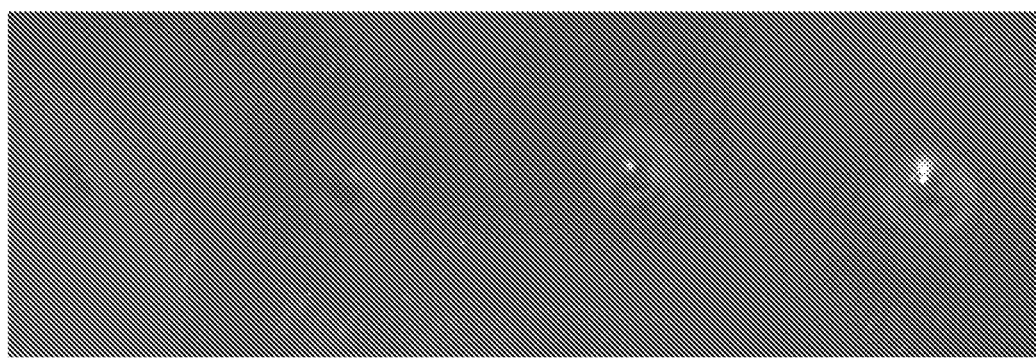
FIG. 1B is related to Example 1 and shows the results of impact testing on an exemplary hybrid sol-gel coated panel.

Impact Resistance: Impact testing was conducted on an SPI Modified Impact Tester from Gardner Company using a 4-LB weight dropped from 5", 10", 20", and 30", respectively, coating-side up. The impacted panels were then soaked for 1-hour in a 1.0 wt. % antimony trichloride slurry followed by rinsing. The results of the conventional sol-gel coating are shown in FIG. 1A. The results of the exemplary hybrid sol-gel coating are shown in FIG. 1B. As shown in FIG. 1A, the conventional sol-gel coating delaminated and separated from the substrate even at a relatively low 5" drop, and substantial coating was removed at the 30" drop height. In comparison, FIG. 1B shows that the hybrid sol-gel coating including the PPS organic polymer dented, but did not delaminate or separate from the coating, even at a drop height of 30".

Abrasion Resistance: A test referred to as a Dry RAT (DRAT; Dry Reciprocating Abrasion Test) test was used as a measure of abrasion resistance for these coatings. This test is meant to simulate the effect of scraping by spatulas and other cooking utensils. A 2-inch abrasive pad (3M Scotch-Brite 07447) was mounted on a 3-kg armature, which was cycled for 1000. The abrasive pad was replaced with a fresh pad every 1000 cycles, and the test continued until 10% of the abraded area has been exposed to bare metal.

The results are shown below in Table 3:

TABLE 3

| DRAT (cycles/mil) | |
|---|---|
| Conventional Coating | Hybrid Coating |
| 25,000 | 87,000 |

As seen in Table 3, the hybrid coating required substantially higher number of cycles per mil than the conventional sol gel coating.

Table 4 below summarizes the compositions of the cured films in terms of % dry volumes:

TABLE 4

| Calculated Dry-Film Volume Fractions | | |
|---|---|---|
| Component | Conventional Coating (vol. %) | Hybrid Coating (vol. %) |
| Colloidal Silica | 20.3 | 18.8 |
| MTMS | 56.7 | 52.8 |
| Silicone Fluid | 4.3 | 4 |
| Black Pigments | 3.3 | 3.3 |
| PPS | 0 | 15.9 |
| Silicon Carbide | 1.15 | 0.98 |
| All Other Fillers | 14.25 | 4.22 |
| TOTAL | 100 | 100 |

As can be seen, the composition of the two coatings is substantially similar except that the hybrid coating contains about 16 vol. % PPS relative to the conventional coating. Both the hardness and the abrasion results clearly show a surprising and significant increase with the inclusion of the PPS. The increase in impact resistance was also unexpected. Without PPS in the cured matrix, the conventional coating fails during testing even at the lowest drop height (5"). The hybrid coating, which contains PPS, does not fail even at the most severe drop condition (30").

Example 2

Conventional and Hybrid Sol-Gel Coatings Based on Variated Compositions

While Example 1 illustrated a system suitable for application on cookware parts, in some situations it is desirable to have a more simplified system free of silicone fluid and with better applicability.

The coating of the present Example 2 was prepared according to the amounts listed in Table 5 below.

TABLE 5

Components of Example 2 Coating

| Component | Weight % |
| --- | --- |
| Colloidal silica (45%) | 32.088 |
| Solvent: Deionized Water | 7.86 |
| Catalyst: Acid | 0.352 |
| Organoalkoxysilane: Methyltrimethoxysilane | 29.7 |
| Solvent: Isopropyl Alcohol | 15.3 |
| Additive: wetting agent | 0.3 |
| Pigment: black spinel | 6 |
| Organic polymer: PPS | 8.4 |
| TOTAL | 100 |

The components were mixed and processed in a suitable order in order to obtain an applicable coating with good film forming capabilities.

The mixture was then sprayed on non-grit blasted Q-panels and cured at the times and temperatures given in Table 6. The hardness of each sample was determined using an Erichsen Hardness Test Pencil Model 318S. Results are shown in Table 6.

TABLE 6

Scratch Resistance

| Cure Temperature (° C.) | Time (Minutes) | Erichsen Hardness (Newtons) |
| --- | --- | --- |
| 280 | 10 | 4 |
| 280 | 20 | 1 |
| 330 | 10 | 4 |
| 330 | 20 | 5 |
| 330 | 20 | 5 |
| 350 | 20 | 14 |
| 350 | 20 | 14 |
| 350 | 20 | 19 |
| 370 | 20 | 20 |
| 420 | 10 | 20 |
| 420 | 10 | 20 |
| 420 | 5 | 20 |
| 420 | 10 | 20 |
| 420 | 10 | 20 |

As shown in Table 6 above, a surprising degree of hardness can be obtained at higher cure temperatures (350° C. or above). This can have great utility depending upon the ultimate application and has not been previously recognized or taught by the prior art.

A similar activation procedure as described above was performed to generate the various Example coatings shown in Table 7 below. To keep the overall solids similar among the formulations, barium sulphate was used to adjust the solids level as the PPS level was varied.

TABLE 7

Composition of Examples A-D

| Component | Example A (wt. %, dry basis) | Example B (wt. %, dry basis) | Example C (wt. %, dry basis) | Example D (wt. %, dry basis) |
| --- | --- | --- | --- | --- |
| Organic polymer: PPS | 8.4 | 5.6 | 2.8 | 0 |
| MTMS | 31.19 | 31.19 | 31.19 | 31.19 |
| Alcoholic Solvent | 15.3 | 15.35 | 15.4 | 15.45 |
| DEIONISED WATER | 7.57 | 7.57 | 7.57 | 7.57 |
| Pigment: SPINEL BLACK | 6 | 6.08 | 6.15 | 6.23 |
| Catalyst: ACID | 0.36 | 0.36 | 0.36 | 0.36 |
| Additive: wetting agent | 0.3 | 0.3 | 0.3 | 0.3 |
| Filler: ANTI SETTLING | 0.11 | 0.11 | 0.11 | 0.11 |
| Filler: COLLOIDAL SILICA (45%) | 30.89 | 30.89 | 30.89 | 30.89 |
| Filler: Inert filler | 0 | 2.68 | 5.37 | 8.05 |

Various properties of Examples A-D were then determined, as set forth in Table 8 below. Dry Film Thickness (DFT) was measured using an ElectroPhysik MiniTest 1001. Gloss was measured using a Byk glossmeter at 60 degrees. Scratch resistance testing was done using the DRAT method as described above. Pencil hardness was measured using ASTM D3363.

TABLE 8

Properties of Examples A-D

| Component | Example A | Example B | Example C | Example D |
| --- | --- | --- | --- | --- |
| % PPS in formula | 8.40 | 5.60 | 2.80 | 0.00 |
| DFT | 39.40 | 35.40 | 28.40 | 16.00 |
| Gloss 60° (370° F. cure) | 42 | 56 | 62 | 69 |
| Scratch resistance (370° F. cure) | 20 | 16 | 9 | 5 |
| Scratch resistance (420° F. cure) | 20 | 16 | 12 | 4 |
| Pencil hardness at room temperature | 9H | 9H | 9H | 2H |
| Pencil hardness at 300° C. | 9H | 9H | 9H | 2H |

As shown in Table 8, high pencil hardness was obtained with all Examples including the PPS organic polymer. In addition, the scratch resistance increased with increasing PPS levels.

Figure 2:
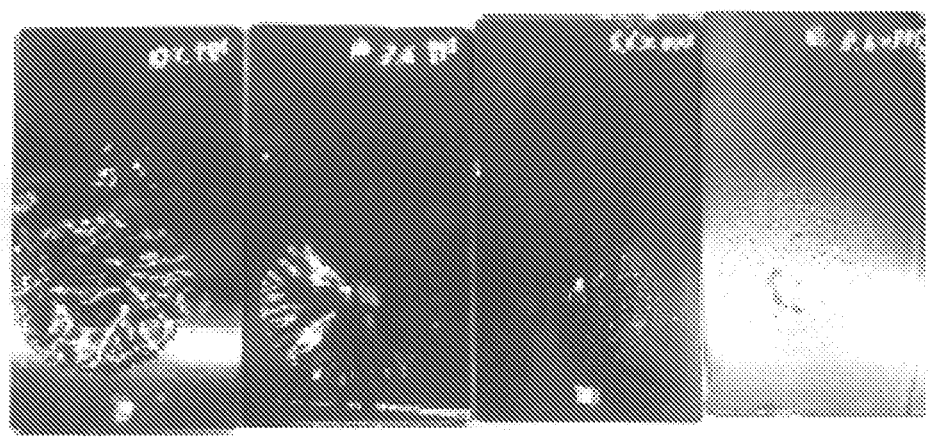
FIG. 2 is related to Example 2 and shows the results of chemical resistance testing on a conventional sol-gel and exemplary hybrid sol-gel coated panels with various levels of polyphenylene sulfide (PPS).

Finally, an additional feature of this invention is improved chemical resistance. As shown in FIG. 2, the samples illustrated, from left to right, are D (0% PPS), C (2.8% PPS), B (5.6% PPS), and A (8.4% PPS). The samples in the top half of the panel were exposed to 10% HCl for 24 hours with no apparent effect. The samples in the bottom half of the panel were exposed to 30% HCl. As shown in FIG. 2, after 24 hours of exposure to 30% HCl, the coatings containing the higher levels of PPS showed much less damage than those with low or no PPS.

Example 3

SEM Analysis of the Cured Coating of Example 2

Figure 3:
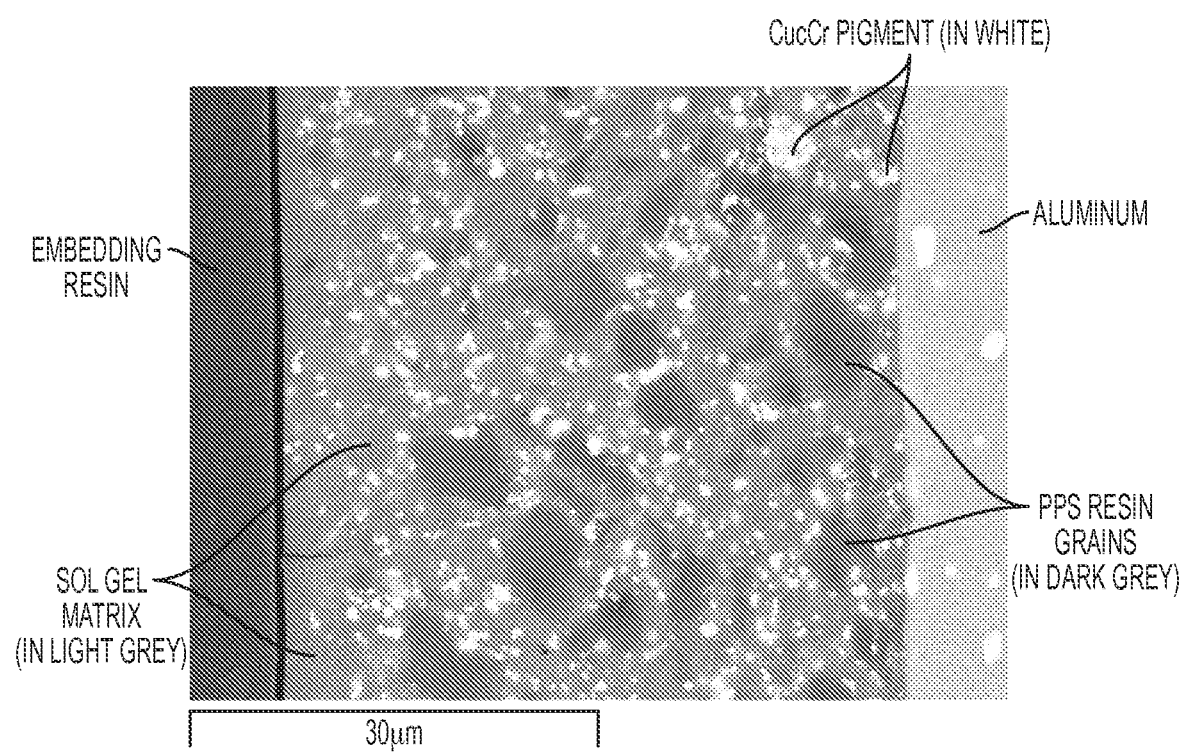
FIG. 3 is related to Example 3 and is a first scanning electron microscope (SEM) cross-sectional image of the cured coating of Example 2.
Figure 4:
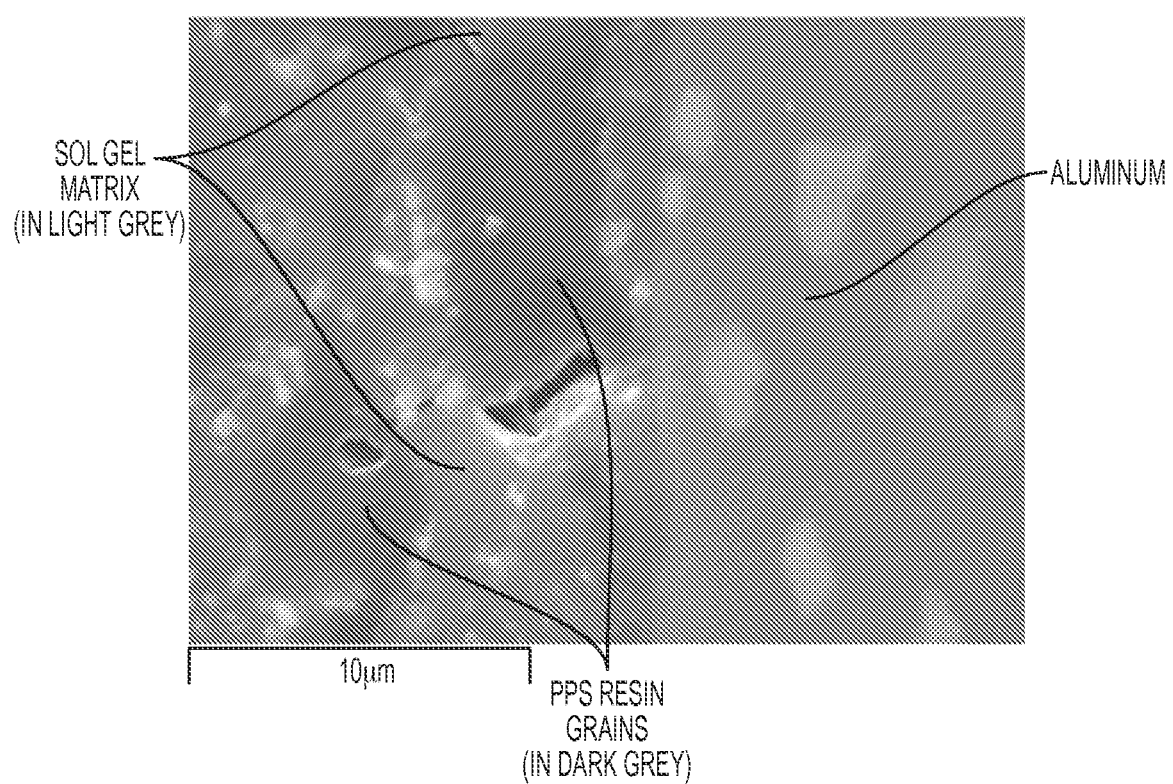
FIG. 4 is related to Example 3 and is a second scanning electron microscope (SEM) cross-sectional image of the cured coating of Example 2.

After the coating of Example 2 was fully cured, cross-sectional scanning electron microscope (SEM) images (backscattered, 20 KV, with additional embedding resin used to obtain image) were obtained through the coating, as shown in FIGS. 3 and 4. As may be seen in FIGS. 3 and 4, PPS grains (dark color) remain separate from, and are uniformly distributed within, the sol get matrix (light grey) throughout the coating thickness. The PPS grains have a particle size of about 8 μm. The pigment (white) is also uniformly distributed throughout the coating thickness.

Example 4

Particle Size Investigation

Compositions including spinel black and organic polymers were prepared according to the weight percentages given in Table 9.

TABLE 9

Composition of Particle Size Examples

| Part Description | A Weight Share (%) | B Weight Share (%) | C Weight Share (%) | D Weight Share (%) |
|---|---|---|---|---|
| Additive: Wetting additive | 0.4 | 0.4 | 0.4 | 0.4 |
| DISPERSING Additive: PIGMENT ADDITIVE | 3 | 3 | 3 | 3 |
| Pigment: Spinel Black | 20 | 20 | 20 | 20 |
| Solvent: alcohol | 48.6 | 48.6 | 48.6 | 48.6 |
| Organic polymer: PPS | 28 | 0 | 0 | 0 |
| Organic polymer: PES | 0 | 28 | 0 | 0 |
| Organic polymer: PEEK | 0 | 0 | 28 | 0 |
| Organic polymer: PAI | 0 | 0 | 0 | 28 |

Each composition was ground at a 1 kg batch size with a ball mill processor 24 hours. After 24 hours, the particle size distribution was measured with a laser diffraction using Beckman Coulter LS. The results are presented in Table 10 and FIG. 5.

TABLE 10

Composition of Particle Size Examples

| Polymer modifier | $D_{50}$ | $D_{90}$ | $D_{99}$ |
|---|---|---|---|
| PAI (comp D) | 8.36 | 21.73 | 34.73 |
| PEEK (comp C) | 3.56 | 10.86 | 14.92 |
| PES (comp B) | 11.35 | 24.52 | 37.48 |
| PPS (Comp A) | 8.18 | 20.29 | 32.11 |

Figure 5:
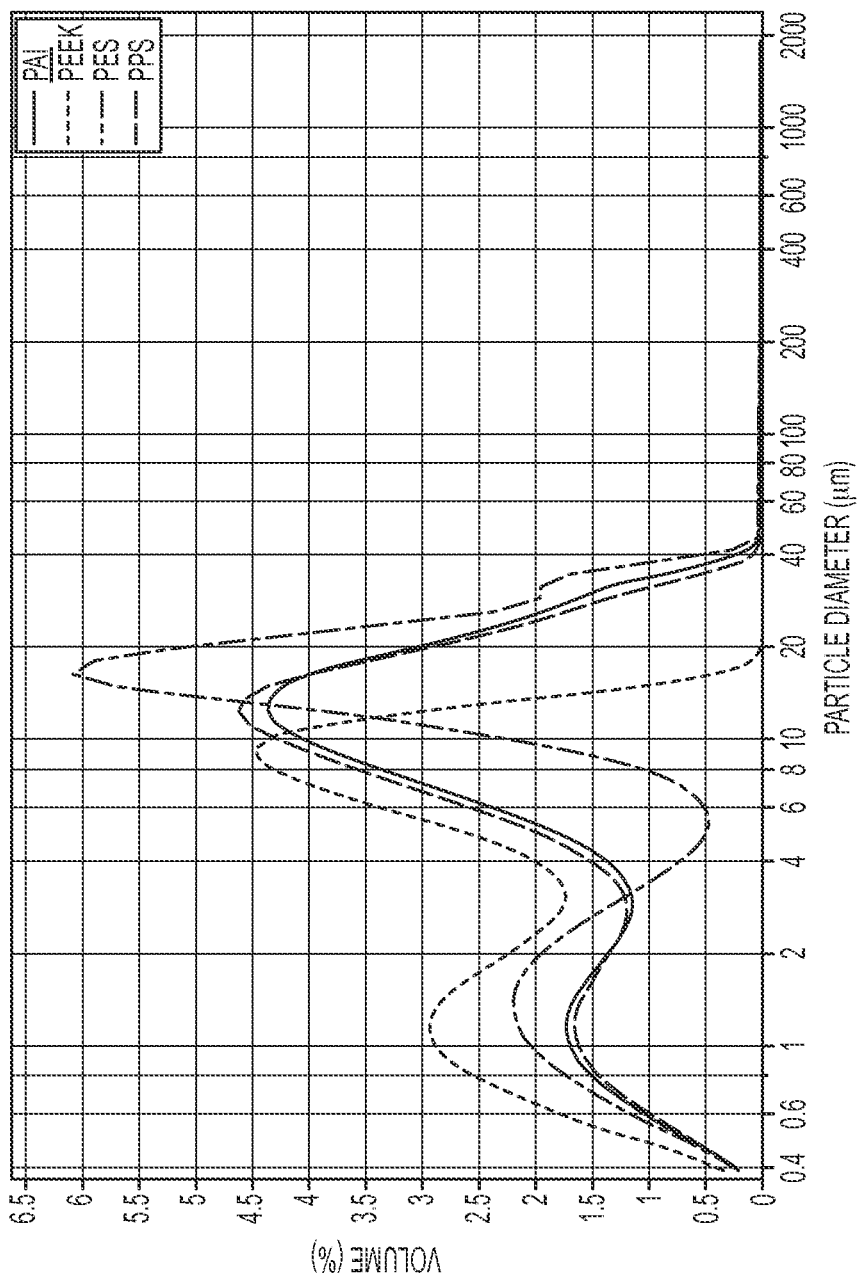
FIG. 5 is related to Example 4 and is the particle size after 24 hours of ball milling.

Referring to FIG. 5, the peak around 1 micron is believed to be related to the spinel black in the sample, while the larger sized peak is believed to be related to the organic polymer. As shown in FIG. 5, PEEK had the smallest particle diameter, followed by PPS and PAI, while the PES had the largest particle diameter.

Example 5

Compositions of Sol-Gel Hybrids with Different Organic Polymers

Compositions including spinel black and organic polymers were prepared according to the weight percentages given in Table 9. The pastes produced by ball milling the organic polymer compositions in Example 4 were introduced into sol-gel matrices according to the compositions in Table 11.

TABLE 11

Composition of Sol-gel hybrids with Different Polymers

| Part Description | Weight Share (%) | Weight Share (%) | Weight Share (%) | Weight Share (%) |
|---|---|---|---|---|
| Colloidal silica (45%) | 31.97 | 31.97 | 31.97 | 31.97 |
| Additive ANTI SETTLING | 0.11 | 0.11 | 0.11 | 0.11 |
| Addtive: WETTING AGENT | 0.12 | 0.12 | 0.12 | 0.12 |
| Additive: PASSIVATING AGENT | 0.18 | 0.18 | 0.18 | 0.18 |
| ACETIC ACID BPC (CH3COOH) | 0.21 | 0.21 | 0.21 | 0.21 |
| FORMIC ACID | 0.14 | 0.14 | 0.14 | 0.14 |
| Pigment: Spinel Black | 6.00 | 6.00 | 6.00 | 6.00 |
| Solvent: Deionized water | 7.86 | 7.86 | 7.86 | 7.86 |
| Solvent: Alcohol | 14.40 | 14.40 | 14.40 | 14.40 |
| MTMS | 29.70 | 29.70 | 29.70 | 29.70 |
| Additive: PIGMENT DISPERSING ADDITIVE | 0.90 | 0.90 | 0.90 | 0.90 |
| Organic polymer: PPS | 8.40 | 0.00 | 0.00 | 0.00 |
| Organic polymer: PES | 0.00 | 8.40 | 0.00 | 0.00 |
| Organic polymer: PEEK | 0.00 | 0.00 | 8.40 | 0.00 |
| Organic polymer: PAI | 0.00 | 0.00 | 0.00 | 8.40 |

Each composition was sprayed onto gritblasted aluminum 3003 alloy panels and dried for 5 minutes at 100° C., followed by curing for 5 minutes at 420° C.

The resulting panels were tested for appearance, hardness, adhesion, impact resistance, chemical resistance, and thermal-gravimetric analysis.

Appearance—Gloss

Figure 6A:
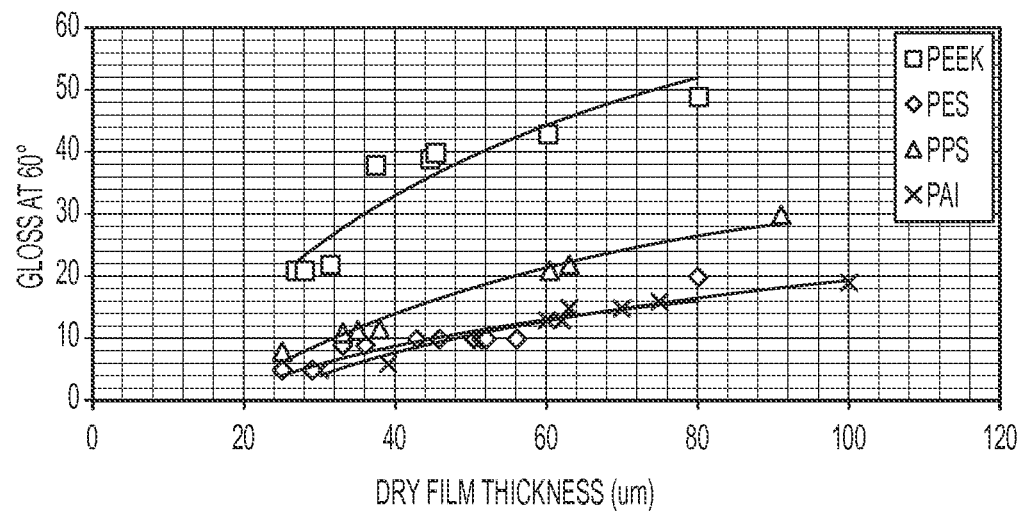
FIG. 6A is related to Example 5 and shows the measured gloss at 60° as a function of dry film thickness in microns.
Figure 6B:
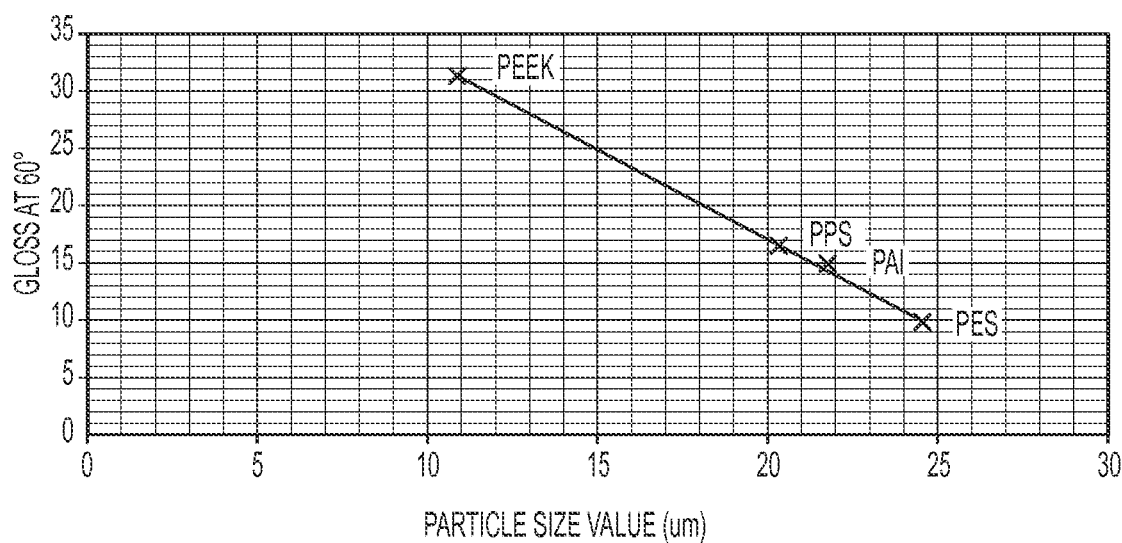
FIG. 6B is related to Example 5 and shows the average gloss measurement for each organic polymer as a function of the polymer particle size.

Each panel was tested for gloss at 60°. The results as a function of film thickness in microns for each organic polymer are presented in FIG. 6A. The dependency on the particle size of each polymer, as measured by the D90, or particle diameter wherein 90% of the particles have a diameter less than the D90 value, is presented in FIG. 6B. As shown in FIG. 6A, the resulting gloss of the applied film is directly related to the dry film thickness of the film. As shown in FIG. 6B, the resulting gloss is inversely proportional to the particle size distribution of the ground polymer. The appearance appears to be independent of the chemical nature of the selected polymer.

Hardness

Figure 7:
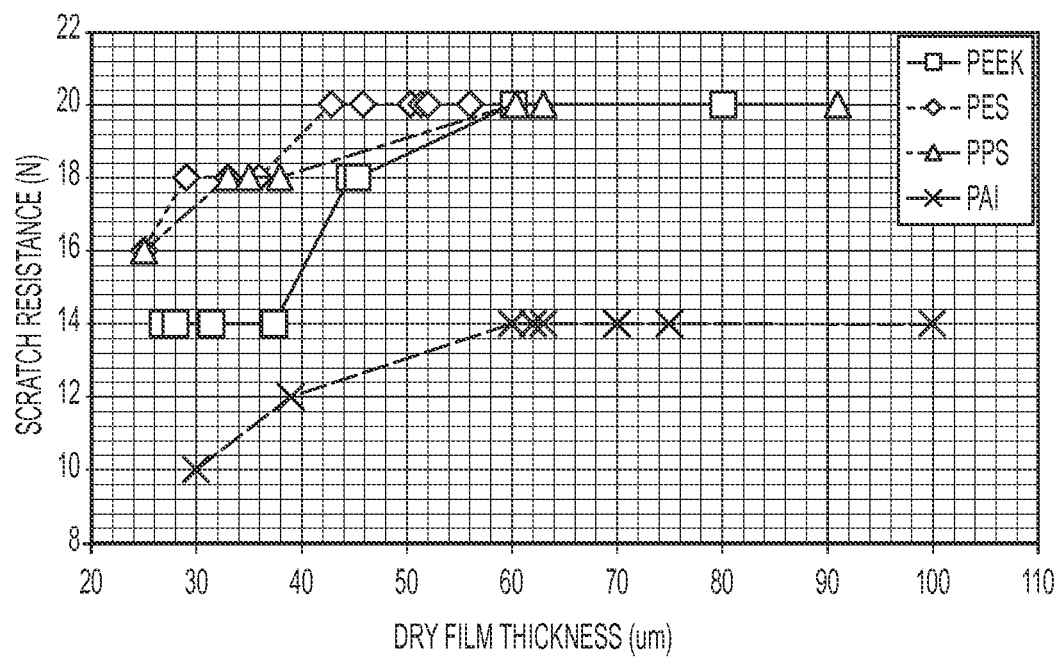
FIG. 7 is related to Example 5 and shows the scratch resistance for each organic polymer.

The scratch resistance of each film, as a function of film thickness, is provided as FIG. 7. The average scratch resistance of each polymer is presented in Table 12.

TABLE 12

Composition of Sol-gel hybrids with Different Polymers

| Organic Polymer | Average scratch resistance (N) |
|---|---|
| PES (B1) | 19.09 |
| PAI (D1) | 13.25 |
| PPS (A1) | 18.57 |
| PEEK (C1) | 16.50 |

As shown in FIG. 7, the PAI generally behaves in a much more brittle way than the other tested polymers. The PES was found to have the highest average scratch resistance and the highest scratch resistance at the lower film thickness.

Adhesion

Figure 8A:
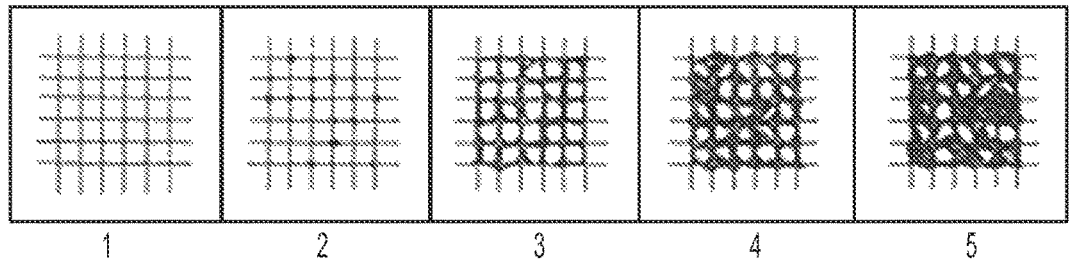
FIG. 8A is related to Example 5 and shows the ISO 2409 standard reference.
Figure 8B:
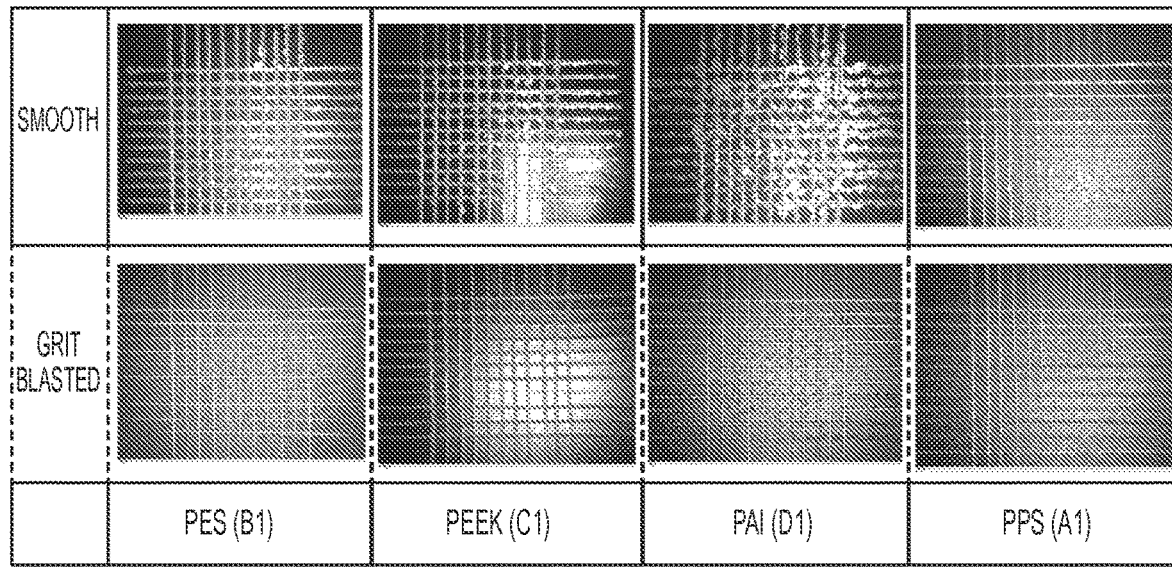
FIG. 8B is related to Example 5 and shows the adhesion pattern for each organic polymer.

The adhesion of each film was determined on a smooth and gritblasted substrate using a cross-cut test according to ISO standard 2409. For each panel, a lattice pattern was cut in the film to the substrate. After brushing the test area with a soft brush, an adhesion test tape was applied to the lattice pattern and removed. The resulting adhesion pattern was ranked by comparing the resulting pattern to the ISO 2409 standard, shown in FIG. 8A. The results of the test are shown in FIG. 7B and summarized in Table 13.

TABLE 13

Composition of Sol-gel hybrids with Different Polymers

| Organic Polymer | Smooth surface ISO Rank Adhesion | Grit Blasted surface ISO Rank Adhesion |
|---|---|---|
| PES (B1) | 2 | 1 |
| PEEK (C1) | 2 | 1 |
| PPS (A1) | 1 | 1 |
| PAI (D1) | 4 | 2 |
| Sol Gel unmodified | 5 | 2 |

Impact Resistance

Figure 9:
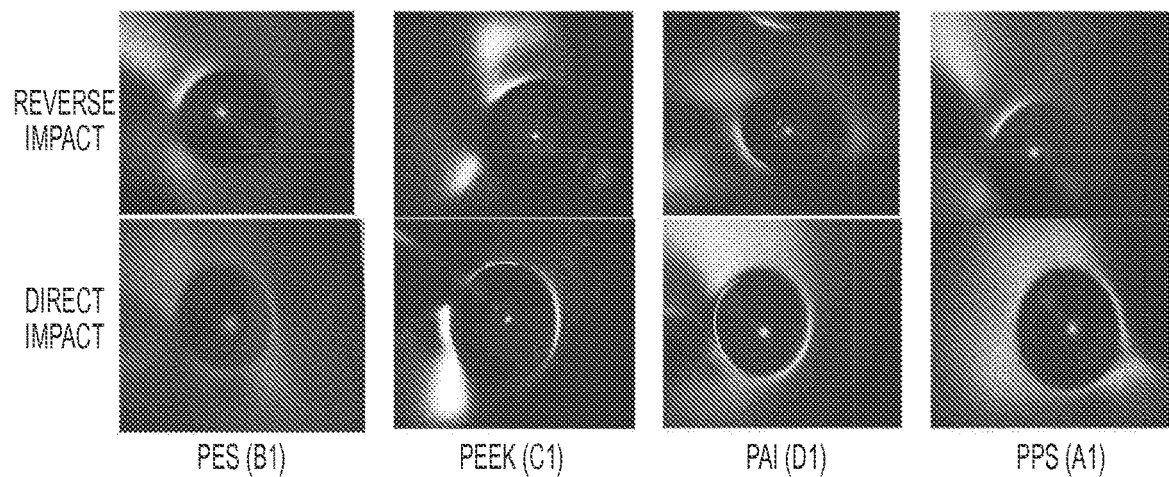
FIG. 9 is related to Example 5 and shows direct and reverse impact resistance test results.

Each coating was subjected to an impact test from a 2 kg weight lifted 20 cm, followed by 60 minutes in a 6% antimony trichloride solution. The results of the impact test are provided in FIG. 9. As shown in FIG. 9, all coatings generally passed the reverse impact test. However, some exposed metal was observed in the direct impact test for PAI and PEEK.

Chemical Resistance

Figure 10:
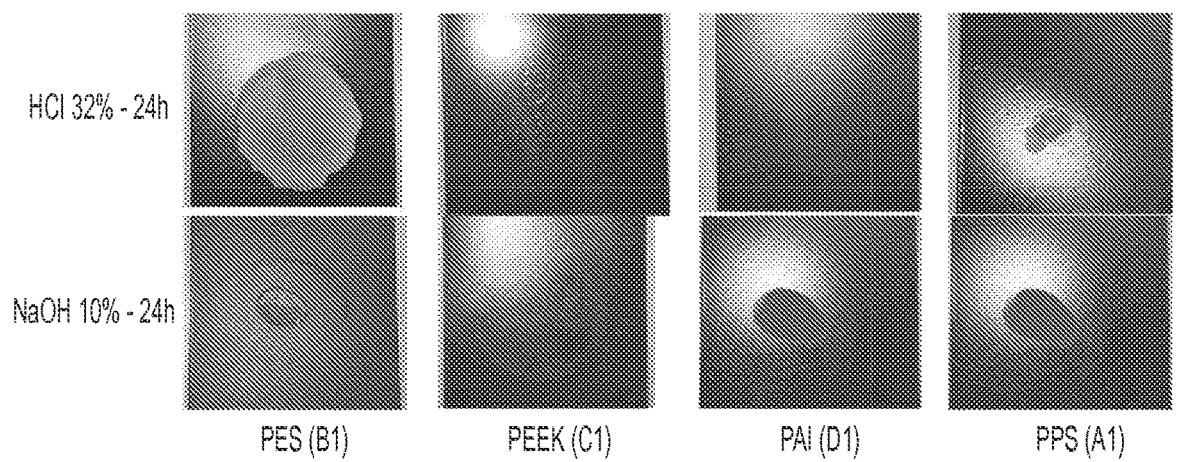
FIG. 10 is related to Example 5 and shows acid and alkali chemical resistance test results.

Chemical resistance was determined by placing a drop of 32% HCl (acidic) or 10% NaOH (alkali) solution on the surface of the coating and covering it with a watch glass. Damage was evaluated after 24 hours. The results of the chemical resistance test are provided in FIG. 10. As shown in FIG. 10, the PAI had the highest acid resistance, and PEEK had the highest alkali resistance.

Thermal Stability

The thermal stability of the sol gel coatings modified with various organic polymers was compared to that of an unmodified sol gel coating. The weight of the sample was recorded in a thermal gravimetric analyser as the samples temperature was increased to 600° C. The results are shown in FIG. 11.

Figure 11:
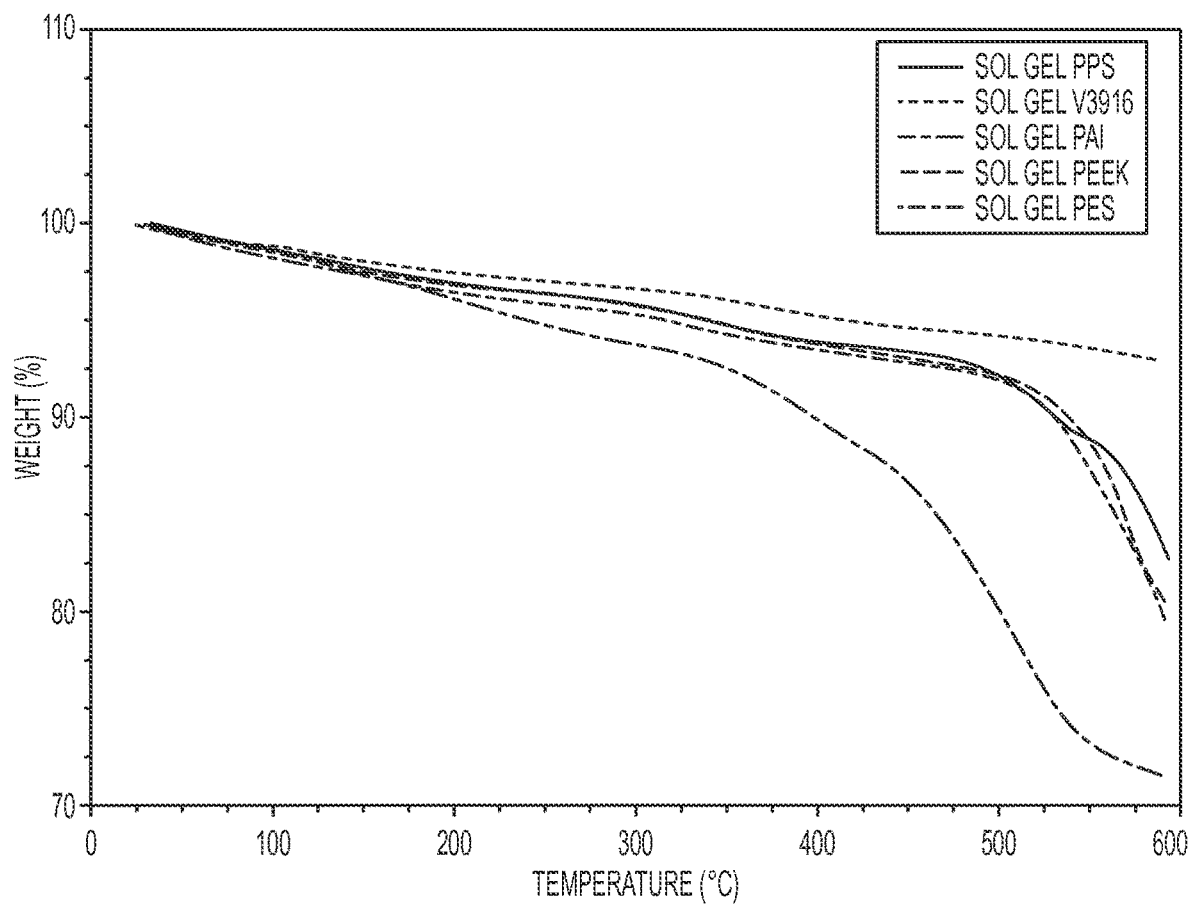
FIG. 11 is related to Example 5 and shows TGA test results.

As shown in FIG. 11, the PAI has the fastest thermal degradation of the modified coatings. Thermal degradation of the PAI begins at about 350° C., while the remaining organic polymers do not begin to thermally degrade until about 530-550° C.

Example 6

Abrasion Resistance Investigation

Figure 12:
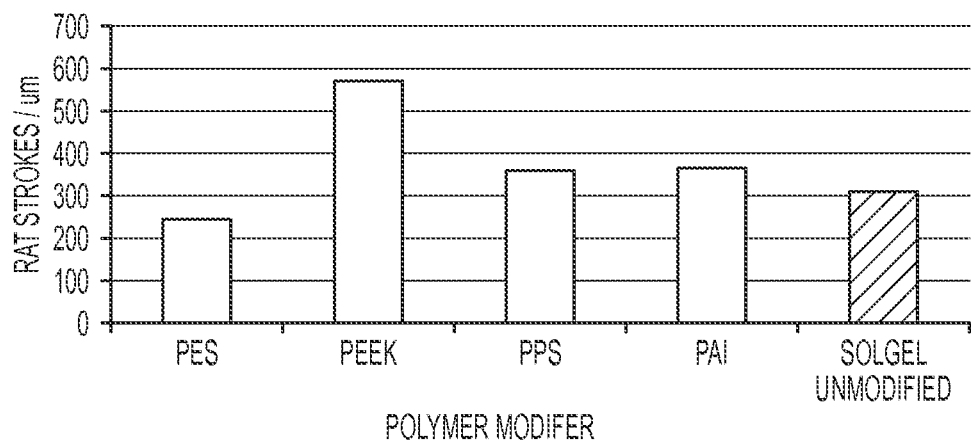
FIG. 12 is related to Example 6 and shows DRAT results.

A Dry Reciprocating Abrasion Test (DRAT) was used as a measure of abrasion resistance for the coatings of Example 5. This test simulates the effect of scraping by spatulas and other cooking utensils. A 2-inch abrasive pad (3M Scotch-Brite 07447) was mounted on a 3-kg armature, which was cycled for 1000. The abrasive pad was replaced with a fresh pad every 1000 cycles, and the test continued until 10% of the abraded area has been exposed to bare metal. The results are shown below in strokes per micron in Table 14 and FIG. 12.

TABLE 14

DRAT (cycles/mil)

| Organic Polymer | RAT strokes/μm |
|---|---|
| PES | 246 |
| PEEK | 574 |
| PPS | 358 |
| PAI | 365 |
| Unmodified sol-gel | 313 |

Each of the organic polymers except PES provided an improvement in abrasion resistance compared to the unmodified sol-gel composition. In particular, the PEEK appeared to provide the highest abrasion resistance among the tested organic polymers.

Next, compositions including an organic polymer and an exemplary hard filler, silicon carbide, were investigated. Compositions were prepared according to the values given in Table 15.

TABLE 15

Hard filler compositions

| Part Description | E Weight Share (%) | F Weight Share (%) | G Weight Share (%) | H Weight Share (%) |
|---|---|---|---|---|
| Inert filler | 8.05 | 7.52 | 2.68 | 2.15 |
| Colloidal silica (45%) | 30.78 | 30.78 | 30.78 | 30.78 |
| Additive: ANTI SETTLING | 0.11 | 0.11 | 0.11 | 0.11 |
| Additive: wetting agent | 0.09 | 0.08 | 0.03 | 0.02 |
| Additive: PASSIVATING AGENT | 0.18 | 0.17 | 0.06 | 0.05 |
| ACETIC ACID BPC (CH3COOH) | 0.22 | 0.22 | 0.22 | 0.22 |
| FORMIC ACID | 0.14 | 0.14 | 0.14 | 0.14 |
| Pigment: Spinel Black | 6.23 | 5.82 | 2.08 | 1.66 |
| Solvent: Deionized water | 7.57 | 7.57 | 7.57 | 7.57 |
| Solvent: alcohol | 15.45 | 14.42 | 18.15 | 17.12 |
| MTMS | 31.19 | 31.19 | 31.19 | 31.19 |
| Organic polymer: PPS | 0.00 | 0.00 | 7.00 | 7.00 |
| Hard filler: silicon carbide 1200 mesch | 0.00 | 2.00 | 0.00 | 2.00 |

Figure 13:
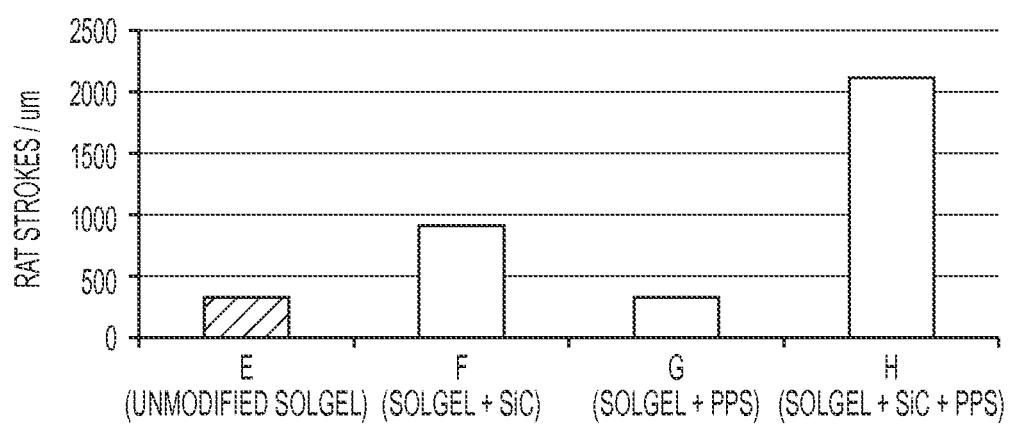
FIG. 13 is related to Example 6 and shows DRAT results.

DRAT results are shown below in strokes per micron in Table 16 and FIG. 13.

TABLE 16

| DRAT (cycles/mil) | |
| --- | --- |
| Modifier | DRAT strokes/μm |
| E (unmodified solgel) | 316 |
| F (solgel + SiC) | 914 |
| G (solgel + PPS) | 333 |
| H (solgel + SiC + PPS) | 2128 |

As shown in Table 14, a moderate increase in abrasion resistance over the unmodified sol-gel was provided when the organic polymer PPS was added. An increase in abrasion resistance over the unmodified sol-gel was provided when the hard filler SiC was added. However, an unexpected synergistic effect was observed from the addition of both the PPS and SiC, with the abrasion resistance more than doubling from the SiC alone addition based solely on the addition of the PPS.

Example 7

Organic Polymer Content Investigation

Compositions were prepared with varying amounts of the organic polymer PPS from 0 to 28 wt. % on a dry basis, according to the values given in Table 17.

TABLE 17

| Compositions of increasing PPS content | | | | | | | |
| --- | --- | --- | --- | --- | --- | --- | --- |
| Part Description | I | J | K | L | M | N | O |
| Colloidal silica (45%) | 43.964 | 41.766 | 39.568 | 35.172 | 26.379 | 17.586 | 8.793 |
| Additive: ANTISETTLING | 0.1566 | 0.1488 | 0.141 | 0.1253 | 0.094 | 0.0627 | 0.031 |
| ACETIC ACID BPC (CH3COOH) | 0.315 | 0.2993 | 0.2835 | 0.252 | 0.189 | 0.126 | 0.063 |
| FORMIC ACID | 0.2065 | 0.1962 | 0.1859 | 0.1652 | 0.1239 | 0.0826 | 0.041 |
| Solvent: Deionized water | 10.808 | 10.267 | 9.7268 | 8.646 | 6.4845 | 4.323 | 2.162 |
| Solvent: alcohol | 0 | 3.25 | 6.5 | 13 | 26 | 39 | 52 |
| MTMS | 44.55 | 42.323 | 40.095 | 35.64 | 26.73 | 17.82 | 8.91 |
| Organic polymer: PPS | 0 | 1.75 | 3.5 | 7 | 14 | 21 | 28 |
| Wt. % (dry basis) of organic polymer | 0.00 | 3.96 | 8.00 | 16.36 | 34.28 | 53.99 | 75.79 |

Figure 14:
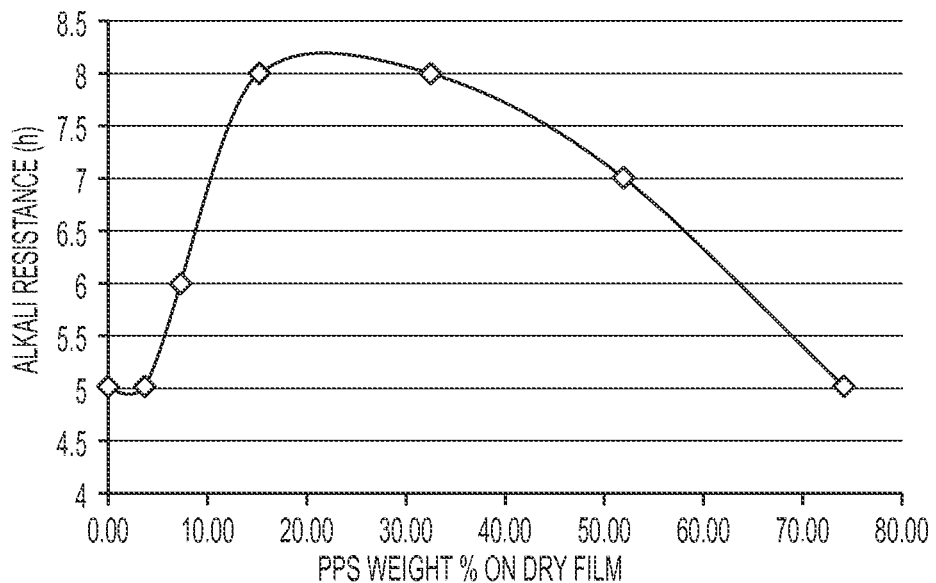
FIG. 14 is related to Example 7 and shows alkali resistance of increasing PPS content.

The alkali chemical resistance ratings of the coatings I-O of Table 17 are provided in FIG. 14 as a function of wt. % PPS on a dry basis. The acid chemical resistance ratings of the same coating are provided in FIG. 15. The scratch hardness values of the same coatings are provided in FIG. 16.

Figure 15:
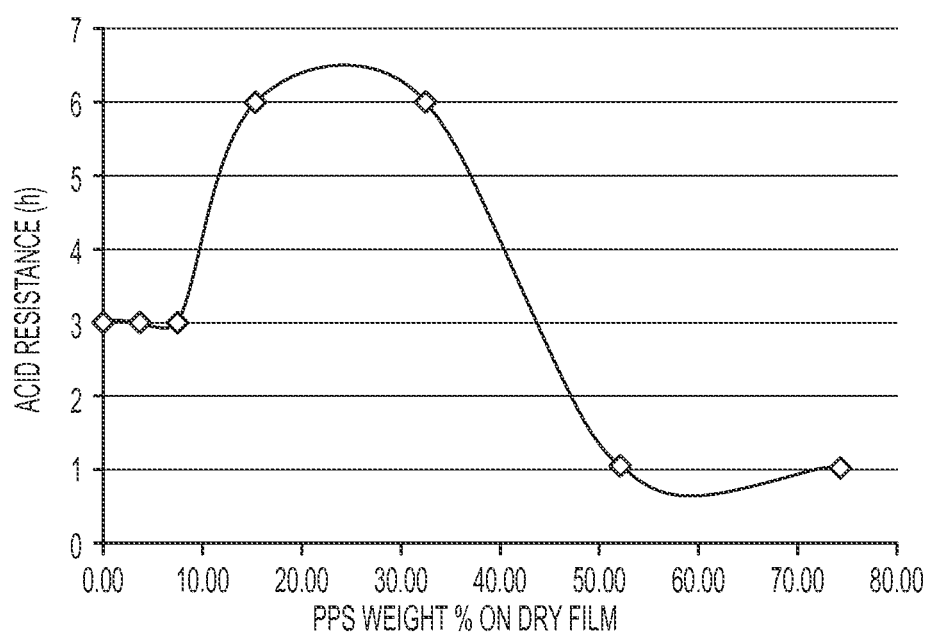
FIG. 15 is related to Example 7 and shows acid resistance of increasing PPS content.
Figure 16:
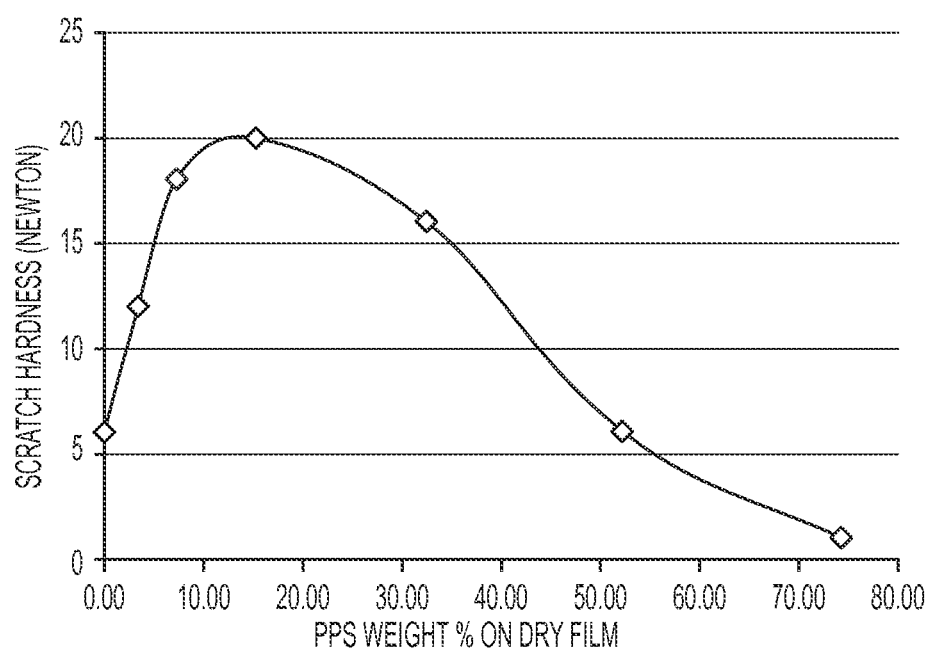
FIG. 16 is related to Example 7 and shows scratch hardness of increasing PPS content.

As shown FIGS. 14 through 16, a range of maximum chemical resistance appears to be about 2-50 wt. % PPS, preferably about 15-35 wt. % PPS, and more preferably about 20-30 wt. % PPS on a dry basis.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A composition for forming a hybrid sol-gel coating, comprising a mixture of:
    one or more organoalkoxysilane monomers selected from methyltrimethoxysilane, methyltriethoxysilane, dimethyldiethoxysilane, dimethyldimethoxysilane, trimethylmethoxysilane, trimethylethoxysilane, phenyltrimethoxysilane, phenyl triethoxysilane, and combinations of the foregoing;
    a catalyst;
    water; and
    an organic polymer comprising polyphenylene sulfide (PPS) having one or more of the following properties:
        a melt point of 200° C. or greater as determined by differential scanning calorimetry (DSC);
        a glass transition temperature of 200° C. or greater as determined by differential scanning calorimetry (DSC); and
        a heat deflection/distortion temperature of 200° C. or greater as determined by ASTM D648.

2. The composition of claim 1, wherein the organic polymer is in the form of polymer particles having a median diameter D50 between 1 and 50 microns.

3. The composition of claim 1, wherein, based on the total amount of the composition on a wet basis,
    the one or more organoalkoxysilane monomers are present in an amount of 20 wt. % to 40 wt. %; and
    the organic polymer is present in an amount of 1.75 wt. % to 15 wt. %.

4. The composition of claim 1, further comprising one or more filler materials present in an amount of 1 wt. % to 10 wt. % based on a total weight of the composition on a wet basis.

5. The composition of claim 1, wherein the one or more organoalkoxysilane monomers are selected from methyltrimethoxysilane, methyltriethoxysilane, phenyltrimethoxysilane, phenyltriethoxysilane, and combinations of the foregoing.

6. A method of forming a coating comprising:
    applying, to a substrate, a mixture comprising:
        one or more organoalkoxysilane monomers selected from methyltrimethoxysilane, methyltriethoxysilane, dimethyldiethoxysilane, dimethyldimethoxysilane, trimethylmethoxysilane, trimethylethoxysilane, phenyltrimethoxysilane, phenyltriethoxysilane, and combinations of the foregoing;
        a catalyst;
        water; and
        an organic polymer comprising polyphenylene sulfide (PPS), polyethersulfone (PES), polyether ether ketone (PEEK), polyphenylsulfone (PPSU), polyamide-imide (PAI), polyetherimide (PEI), or any combination of the foregoing, each organic polymer further comprising one or more of the following properties:

a melt point of 200° C. or greater as determined by differential scanning calorimetry (DSC);

a glass transition temperature of 200° C. or greater as determined by differential scanning calorimetry (DSC); and a heat deflection/distortion temperature of 200° C. or greater as determined by ASTM D648; and curing the mixture to produce a hybrid sol-gel coating having a thickness from 25 to 60 microns.

7. The method of claim 6, wherein the substrate is an article of cookware.

8. The method of claim 6, wherein the organic polymer comprises polyphenylene sulfide (PPS).

9. The method of claim 6, wherein the organic polymer comprises polyether ether ketone (PEEK).

10. The method of claim 6, wherein the organic polymer is in the form of polymer particles having a median diameter D50 between 1 and 50 microns.

11. The method of claim 6, wherein, based on the total amount of the mixture on a wet basis, the one or more organoalkoxysilane monomers are present in an amount of 20 wt. % to 40 wt. %; and the at least one organic polymer is present in an amount of 1.75 wt. % to 15 wt. %.

12. The method of claim 6, further comprising one or more filler materials present in an amount of 1 wt. % to 10 wt. % based on a total weight of the composition on a wet basis.

13. The method of claim 6, wherein the one or more organoalkoxysilane monomers are selected from methyltrimethoxysilane, methyltriethoxysilane, phenyltrimethoxysilane, phenyltriethoxysilane, and combinations of the foregoing.

14. An article of cookware coated with the hybrid sol-gel coating of claim 6.

15. An article of cookware coated with the coating composition of claim 1.

* * * * *